United States Patent [19]

Godfrey

[11] 4,079,432
[45] Mar. 14, 1978

[54] MOTOR RESTART LIMITER
[75] Inventor: William L. Godfrey, Dallas, Tex.
[73] Assignee: Mobil Oil Corporation, New York, N.Y.
[21] Appl. No.: 681,638
[22] Filed: Apr. 29, 1976
[51] Int. Cl.$^2$ .............................. H02H 7/08
[52] U.S. Cl. ......................... 361/23; 361/22; 318/485; 318/487; 318/447
[58] Field of Search ............. 318/447, 452, 473, 485, 318/487; 317/13 A, 22; 361/22, 23, 29

[56] References Cited
U.S. PATENT DOCUMENTS
3,875,487  4/1975  White ................................. 318/485

Primary Examiner—Robert K. Schaefer
Assistant Examiner—Michael K. Mutter
Attorney, Agent, or Firm—C. A. Huggett; George W. Hager, Jr.

[57] ABSTRACT

A motor is electrically coupled to a power source through a motor starter. The motor is selectively operated by a relay to connect and disconnect the power source to the motor. A counter accumulates a count of motor failures and produces an inhibit signal should the frequency of occurrence of such motor failures exceed a given level. The relay is operated by an inhibit signal to cause the motor starter to disconnect the power source from the motor.

5 Claims, 4 Drawing Figures

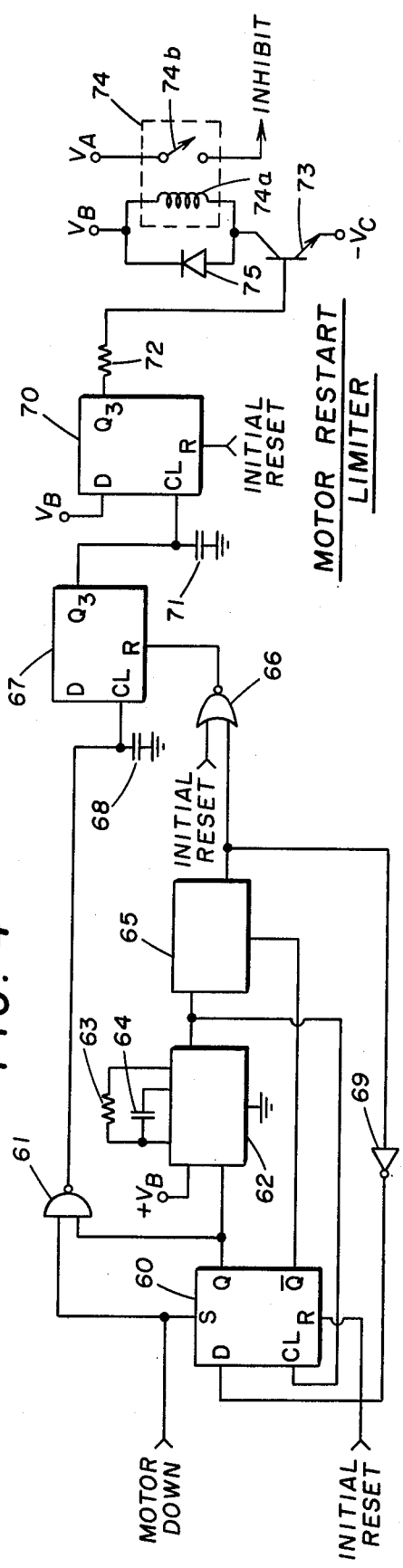
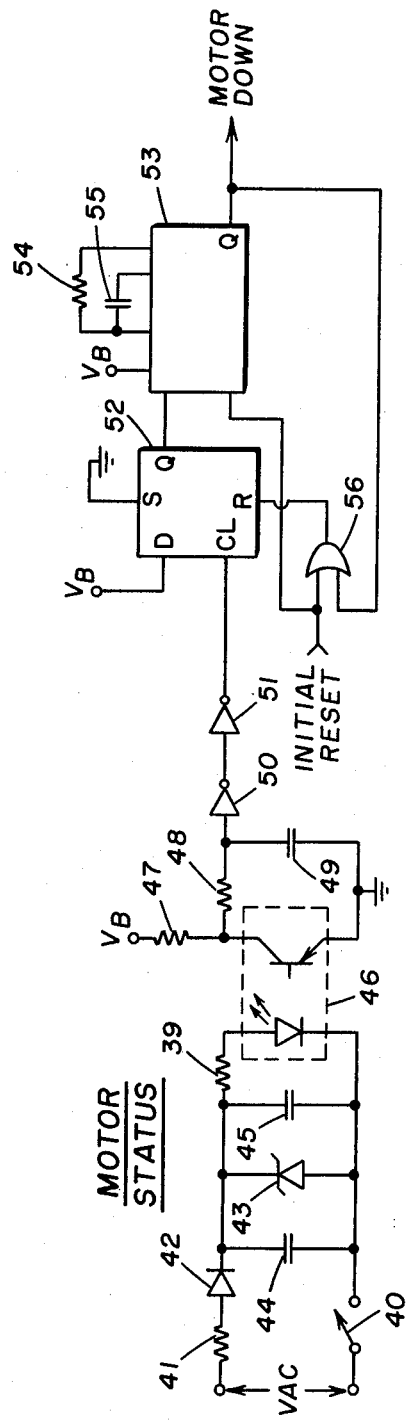
FIG. 4
FIG. 3

MOTOR RESTART LIMITER

BACKGROUND OF THE INVENTION

Induction motors are conventionally used in controlling the operation of a pipeline pumping station. Due to the nature of pipeline operations, these motors are intermittently operated to turn the pumps ON and OFF. The starting current required for operating large induction motors is sufficient to cause a heat build-up in the windings. Too great a heat build-up can damage the windings. It is therefore important that the motor be run long enough to dissipate this start-up heat or, in the alternative, turned OFF long enough to dissipate the heat prior to a subsequent starting of the motor.

Various system malfunctions can cause the pumping operation to be started too frequently for safe operation of these large induction starting motors. Two such examples are resistor failures in the unit starter, resulting in a pulsing of the starter, and pressure fluctuations at pressure controlled stations. Various electromechanical devices have been utilized to prevent these malfunctions from resulting in heat build-up damage to the starting motor. Such devices have included stepping switches and timers for counting the number of motor startings and ensuring a minimum cooling time between each starting.

SUMMARY OF THE INVENTION

The present invention is directed to a system for controlling the connection of a power source to a motor to prevent damaging heat build-up in the motor due to the starting currents. In this aspect, the operating condition of the motor is detected and the motor is inhibited from restarting whenever the frequency of occurrence of motor failures exceeds a given level.

More particularly, a selected time period is started in response to the first motor failure. A count is accumulated of successive motor failures. Should this accumulated count reach a predetermined number prior to the end of such selected time period, the motor is inhibited from further restarts until it is reset. In this aspect, a motor-down signal is produced in response to each motor failure. A shift register is shifted one position in response to each such signal. The selected time period is started upon the enabling of an oscillator in response to the first motor-down signal. The pulses from this oscillator are counted by means f a counter, and the time period terminated when a selected number of oscillator pulses have been counted. Should the time period not be completed prior to the shift register being shifted a predetermined number of positions, the motor will be inhibited from further restarts. However, should the time period be completed prior to the shift register being shifted the predetermined number of positions, it will be reset and both the counting of motor failures and the starting of the selected time period will be reinitiated.

BRIEF DESCRIPTION OF THE DRAWINGS

FIG. 2-4 are electrical schematic diagrams of those portions of FIG. 1 illustrated in block form.

DETAILED DESCRIPTION OF THE PREFERRED EMBODIMENT

Figure 1:
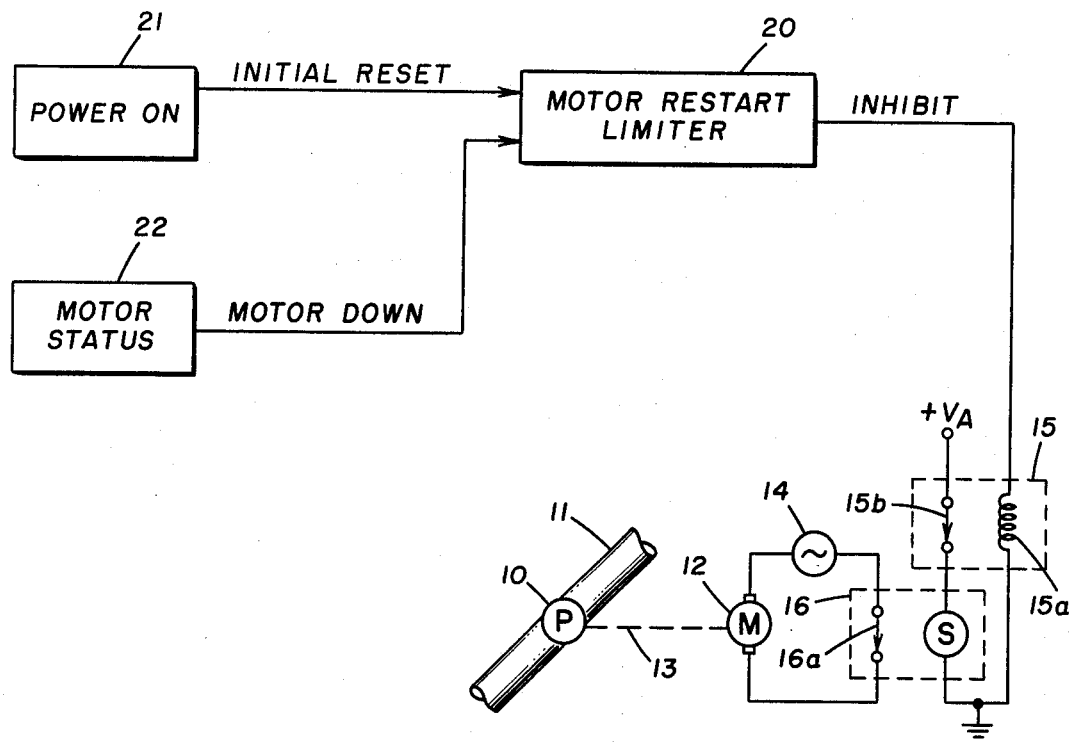
FIG. 1 illustrates a typical motor-driven pumping operation including the motor restart limiter of the present invention.

Referring now to FIG. 1, there is illustrated a pump 10 for delivering fluid products along a pipeline 11. The pump 10 is driven by the motor 12 shown mechanically coupled to the pump by way of dashed line 13. The motor 12 may be a conventional single-phase induction motor. A motor power supply 14 is coupled to the motor 12 by way of contacts 16a of a starter 16 and provides the single-phase AC power required for driving the motor 12. A motor control relay 15 includes normally closed contacts in series with the starter 16 and the voltage source $V_A$. The operation of motor control relay 15 is controlled by a motor inhibit signal from the motor restart limiter 20.

Under normal operating conditions, the motor control relay 15 is de-energized and its normally closed contacts 15b permit the voltage source $V_A$ to energize the starter 16. When starter 16 is energized, the contacts 16a are closed to electrically connect the power source 14 to the motor 12. However, under an adverse operating condition of the motor 12, such as an excessive heat build-up in the windings that could cause damage to the motor, the motor restart limiter 20 produces a motor inhibit signal which energizes the motor control relay 15, opening its normally closed contacts 15b to cause starter 16 to be de-energized, thereby breaking the electrical connection of the power source 14 to the motor 12.

The operation of the motor restart limiter is controlled by an initial reset signal from the power-on unit 21; a motor-down signal and a motor-running signal from the motor status unit 22; and an indication of a temperature condition of the motor by way of the line 23.

Figure 2:
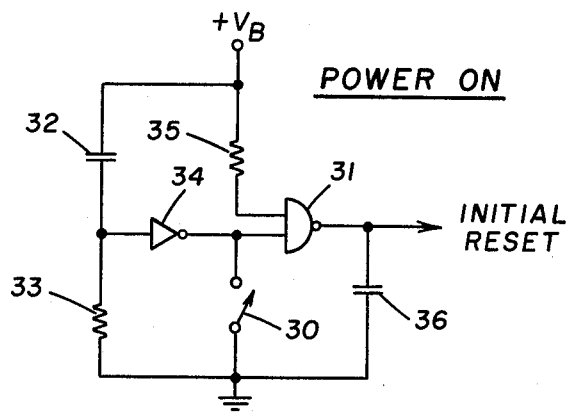

Units 21 and 22 will now be described in detail with reference to FIGS. 2 and 3 prior to the description of the motor restart limiter 20 of FIG. 4. In this manner, the operation of motor restart limiter 20 under the control of units 21 and 22 will be more fully understood.

POWER-ON (FIG. 2)

Prior to the initial attempt at starting up the motor 12, the switch 30 in the power-on unit is closed to provide a ground potential to one input of the NAND gate 31. This sets the output of NAND gate 31 to go to a logic "1". This output is utilized as an initial reset signal to reset the various counters, shift registers, and flip-flops in the motor restart limiter 20. The remaining components 32–36 and the voltage supply $+V_B$ provide the necessary bias conditions for the operation of the power-on unit 21.

MOTOR STATUS (FIG. 3)

The switch 40 is opened and closed in response to the operation of motor 12. When motor 12 is running, switch 40 is closed. When motor 12 is idle, or shut down, switch 40 is open. More specifically, when switch 40 is closed, the voltage VAC is rectified to a 15-VDC level by resistor 41, diode 42, Zener diode 43, and capacitors 44–45. This 15-VDC level forward biases the CED driver portion of the optically coupled isolator 46. This turns ON the transistor portion, pulling its collector to ground through collector resistor 47 to produce a logic "0" signal. This logic "0" signal is applied by way of the RC filter including resistor 48 and capacitor 49 to inverter 50. The output of inverter 50 is therefore a logic "1" signal whenever the motor is running. Inverter 51 is coupled to the output of inverter 50 to provide for an additional logic "1" signal whenever the switch 40 is open to indicate that the motor has shut down or become idle.

When the motor does become idle, inverter 51 provides the logic "1" signal to the clock input of the flip-flop 52. This sets flip-flop 52 to a logic "1" output, which in turn causes the one-shot multivibrator 53 to produce a 55-millisecond motor-down signal for use by the motor restart limiter 20. The multivibrator 53 is biased by the resistor 54 and capacitor 55. The multivibrator 53 is reset by the initial reset signal, while flip-flop 52 is reset through NOR gate 56 by either the initial reset signal or the motor-down signal of the multivibrator 53.

MOTOR RESTART LIMITER (FIG. 4)

The motor restart limiter 20 operates to detect rapid recycling of the motor as indicated by oscillation of the motor contactor switch 40 in the motor status unit 22. If this occurs, the motor will be inhibited until the switch 30 of the power-on unit 21 is reset. This is accomplished by counting the number of switch 40 openings and inhibiting the motor should the count reach a predetermined number during a given time period. In the preferred embodiment of the motor restart limiter, to be hereinafter described in detail, the motor will be inhibited should the frequency of occurrence of switch 40 openings reach three openings within any 4-second period.

Referring now to FIG. 4, the motor-down signal from the motor status unit 22 sets the flip-flop 60 to provide a logic "1" signal on its Q output each time the switch 40 of the motor status unit 22 opens to indicate a motor failure. This Q output is combined with the motor-down signal to provide a logic "1" output pulse from gate 61 to the clock input of the shift register 67. Each such pulse shifts the Q output of shift register 67 by one position. The third such pulse produces a logic "1" pulse on the Q₃ output. This drives the clock input of flip-flop 70 to provide a logic "1" output through resistor 72 to the base input of transistor 73. Transistor 73 turns ON and relay 74 is energized. Relay contacts 74b close to provide an inhibit signal to the relay 15 of FIG. 1. This opens the normally closed contacts 15b to cause starter 16 to be de-energized, thereby breaking the electrical connection of the power source to the motor 12.

The Q output of flip-flop 60 also energizes the oscillator 63 in response to the first motor-down signal. The output pulses of oscillator 63 are counted by the counter 65. In the preferred embodiment, the oscillator 63 produces a 531-hertz output. The counter 65 produces a logic "1" signal upon 2048 pulses having been counted. This occurs in approximately 4 seconds. Upon such count being reached, counter 65 provides this logic "1" signal through the gate 66 to the reset input of the shift register 67, thereby clearing it of the count of the motor-down signals. This logic "1" signal from counter 65 also is applied through the inverter 69 as a logic "0" signal to the D input of flip-flop 60. Upon the next oscillation of the oscillator 62, flip-flop 60 is clocked directly by the output of oscillator 62 to yield a logic "0" signal on its Q output and a logic "1" signal on its Q output. These signals disable the oscillator 62 and reset the counter 65, respectively.

In accordance with the specific embodiment described herein and illustrated in the accompanying drawings, the following TABLE I sets forth specific types and values of circuit components which may be utilized.

TABLE I

| Component | Description |
|---|---|
| Shift register 67 | RCA CD4015AE |
| Flip-flops 52, 60, and 70 | RCA CD4013AE |
| Oscillators 53 and 62 | RCA CD4047AE |
| Counter 65 | RCA CD4040AE |
| Isolator 46 | TI T1L112 |
| Zener diode 43 | Motorola 1N4744 |
| Diodes 42 and 75 | Motorola 1N4005 |
| Transistor 73 | Motorola MPS3705 |
| Relay 74 | Potter and Brumfield KHP17D11-12 |
| Gates 56 and 66 | RCA CD4071BE |
| Gate 61 | RCA CD4081BE |
| Gate 31 | RCA CD40011AE |
| Inverters 34, 50, 51, and 69 | RCA CD4009AE |
| Resistor 63 | 9.1 Kohms |
| Resistor 41 | 3 Kohms |
| Resistors 35, 47, and 72 | 10 Kohms |
| Resistor 39 | 1 Kohm |
| Resistor 33 | 1 Mohm |
| Resistor 48 | 100 Kohms |
| Resistor 54 | 47 Kohms |
| Capacitor 64 | .047 microfarad |
| Capacitors 44 and 45 | 15 microfarads |
| Capacitor 36 | 0.01 microfarad |
| Capacitor 71 | .001 microfarad |

I claim:

1. A system for controlling the operation of a motor to prevent damaging heat build-up within the motor windings due to motor recycling, comprising:
    (a) means responsive to the condition of said motor for producing a signal each time the motor fails,
    (b) means for accumulating a count of said signals over a predetermined time period,
    (c) means for inhibiting the recycling of the motor whenever the count of said signals exceeds a predetermined number during said predetermined time period, said predetermined time period and said predetermined count being selected such that the ratio of said predetermined count to said predetermined time period is an indication of an excessive recycling rate of the motor.

2. The system of claim 1 wherein said means for inhibiting the restarting of the motor comprises:
    (a) a shift register enabled to be shifted one position in response to each produced signal,
    (b) means for resetting said shift register a given time period after said shift register has been enabled, and
    (c) means responsive to the output of said shift register for inhibiting the restarting of the motor should said shift register be shifted a predetermined number of positions during said time period.

3. The system of claim 2 wherein said means for resetting said shift register comprises:
    (a) an oscillator, and
    (b) a counter enabled to count the output pulses from said oscillator and to provide an output when a predetermined number of pulses have been counted, said output being utilized to reset said shift register.

4. The system of claim 2 wherein same means for inhibiting said motor comprises:
    (a) a flip-flop that is set whenever said shift register has been shifted said predetermined number of positions during said time period, and
    (b) a relay time is energized to inhibit restarting of said motor during the time said flip-flop is set.

5. The system of claim 4 further including:
    (a) means for resetting said flip-flop to allow restarting of said motor.

* * * * *

UNITED STATES PATENT AND TRADEMARK OFFICE
CERTIFICATE OF CORRECTION

PATENT NO. : 4,079,432
DATED : March 14, 1978
INVENTOR(S) : William L. Godfrey

It is certified that error appears in the above-identified patent and that said Letters Patent are hereby corrected as shown below:

Column 1, line 50, "f" should be --of--.
         line 67, "FIG." should be --FIGS.--.
Column 3, line 63, "Q" (second occurrence) should be -- $\overline{Q}$ --.
Column 4, line 58, "same" should be --said--.
         line 63, "time" should be --that--.

Signed and Sealed this

Fifteenth Day of August 1978

[SEAL]

Attest:

RUTH C. MASON
Attesting Officer

DONALD W. BANNER
Commissioner of Patents and Trademarks